United States Patent
Tanimoto et al.

(10) Patent No.: US 11,664,553 B2
(45) Date of Patent: May 30, 2023

(54) EXTERIOR BODY, LAMINATED BATTERY AND METHOD FOR PRODUCING EXTERIOR BODY COMPRISING A CORNER INCLUDING A CURVED PORTION AND A STRAIGHT PORTION

(71) Applicant: Toyota Jidosha Kabushiki Kaisha, Toyota (JP)

(72) Inventors: Koichi Tanimoto, Nisshin (JP); Satomi Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 17/113,646

(22) Filed: Dec. 7, 2020

(65) Prior Publication Data

US 2021/0184185 A1 Jun. 17, 2021

(30) Foreign Application Priority Data

Dec. 13, 2019 (JP) .............................. JP2019-225130

(51) Int. Cl.
*H01M 50/148* (2021.01)
*H01M 50/166* (2021.01)
*H01M 50/155* (2021.01)
*H01M 10/0525* (2010.01)

(52) U.S. Cl.
CPC ....... *H01M 50/148* (2021.01); *H01M 50/155* (2021.01); *H01M 50/166* (2021.01); *H01M 10/0525* (2013.01)

(58) Field of Classification Search
CPC ............. H01M 50/148; H01M 50/155; H01M 50/166; H01M 50/0525; H01M 50/105
See application file for complete search history.

(56) References Cited

U.S. PATENT DOCUMENTS

2004/0048149 A1* 3/2004 Gross .................. H01M 50/124
429/185

FOREIGN PATENT DOCUMENTS

| CN | 109103508 A | * | 12/2018 | .......... H01M 10/058 |
| JP | 2001202931 A | | 7/2001 | |
| JP | 2015-079719 A | | 4/2015 | |
| KR | 2009-0076280 A | * | 7/2009 | .............. H01M 2/02 |

OTHER PUBLICATIONS

EPO machine generated English translation of CN-109103508-A (Year: 2018).*
EPO machine generated English translation of KR-2009-0076280-A (Year: 2009).*

* cited by examiner

*Primary Examiner* — Christopher P Domone
*Assistant Examiner* — Kimberly Wyluda
(74) *Attorney, Agent, or Firm* — Dinsmore & Shohl LLP

(57) ABSTRACT

A main object of the present disclosure is to provide an exterior body wherein the thickness at corner of the convex structure is suppressed from being thinned. The present disclosure achieves the object by providing an exterior body for a laminated battery, and the exterior body comprises a convex structure with a space for enclosing a power generation element, the convex structure includes a top surface, in plan view, the top surface includes a first side, a second side extending in a direction crossing the first side, and a corner $C_{12}$ connecting the first side and the second side, and in plan view, the corner $C_{12}$ includes a curved portion 1A, a straight portion $L_{12}$, and a curved portion 2B, from the first side toward the second side.

6 Claims, 4 Drawing Sheets

EXTERIOR BODY, LAMINATED BATTERY AND METHOD FOR PRODUCING EXTERIOR BODY COMPRISING A CORNER INCLUDING A CURVED PORTION AND A STRAIGHT PORTION

CROSS-REFERENCE TO RELATED APPLICATIONS

This application is based upon and claims the benefit of priority of the prior Japanese Patent Application No. 2019-225130, filed on Dec. 13, 2019, the entire contents of which are incorporated herein by reference.

TECHNICAL FIELD

The present disclosure relates to an exterior body, a laminated battery using the same and a method for producing an exterior body.

BACKGROUND ART

Recently, lithium ion battery has been put into practical use as a high-voltage and high-energy-density battery. As one embodiment of such a battery, a laminated battery wherein a power generation element is enclosed by laminate sheets (exterior bodies), is known. For example, Japanese Patent Application Laid-Open (JP-A) No. 2015-079719 discloses an all solid state battery comprising a battery element enclosed by the laminate sheets (exterior bodies).

SUMMARY OF DISCLOSURE

Technical Problem

In an exterior body used in a laminated battery, a convex structure including a space for enclosing a power generation element is formed in some cases. The convex structure is formed by, for example, flanging (pressing) a laminate sheet. The corner of the convex structure is easily thinned by the stress at the time of pressing, and there may be a case where tearing occurs in the exterior body.

The present disclosure has been made in view of the above circumstances, and a main object thereof is to provide an exterior body wherein the thickness at corner of the convex structure is suppressed from being thinned.

Solution to Problem

In order to achieve the object, the present disclosure provides an exterior body for a laminated battery, and the exterior body comprises a convex structure with a space for enclosing a power generation element, the convex structure includes a top surface, in plan view, the top surface includes a first side, a second side extending in a direction crossing the first side, and a first corner $C_{12}$ connecting the first side and the second side, and in plan view, the corner $C_{12}$ includes a first primary curved portion 1A, a first straight portion $L_{12}$, and a first secondary curved portion 2B, from the first side toward the second side.

According to the present disclosure, since corner $C_{12}$ includes straight portion $L_{12}$, the thickness at corner $C_{12}$ of the exterior body may be suppressed from being thinned.

In the present disclosure, a height of the convex structure may be 3 mm or more.

In the present disclosure, in plan view, the top surface may include a third side facing the first side, a fourth side facing the second side, a second corner $C_{23}$ connecting the second side and the third side, a third corner $C_{34}$ connecting the third side and the fourth side, and a fourth corner $C_{41}$ connecting the fourth side and the first side.

In the present disclosure, in plan view, the corner $C_{23}$ may include a second primary curved portion 2A, a second straight portion $L_{23}$, and a second secondary curved portion 3B, from the second side toward the third side.

In the present disclosure, in plan view, the corner $C_{34}$ may include a third primary curved portion 3A, a third straight portion $L_{34}$, and a third secondary curved portion 4B, from the third side toward the fourth side.

In the present disclosure, in plan view, the corner $C_{41}$ may include a fourth primary curved portion 4A, a fourth straight portion $L_{41}$, and a fourth secondary curved portion 1B, from the fourth side toward the first side.

The present disclosure also provides a laminated battery comprising a first exterior body, a second exterior body, and a power generation element enclosed between the first exterior body and the second exterior body, and at least one of the first exterior body and the second exterior body is the above described exterior body.

According to the present disclosure, by using the above described exterior body, a laminated battery with high structural reliability may be obtained.

The present disclosure also provides a method for producing the above described exterior body, the method comprising a flanging step of forming the convex structure by flanging a laminate film, and a mold used for the flanging has a shape corresponding to the corner $C_{12}$.

According to the present disclosure, since the mold used for the flanging has a shape corresponding to the corner $C_{12}$, an exterior body wherein the thickness at corner of the convex structure is suppressed from being thinned, may be obtained.

Effects of Disclosure

The exterior body in the present disclosure exhibits an effect such that the thickness at corner of the convex structure may be suppressed from being thinned.

DESCRIPTION OF EMBODIMENTS

Hereinafter, an exterior body, a laminated battery, and a method for producing an exterior body in the present disclosure will be described in detail. In the present specification, in expressing an embodiment of arranging a member on another member, when merely expressed as "on" or "under", it includes both the case of arranging a member directly on or directly under another member so as to be in contact with another member, and the case of arranging a member above or below another member via still another member, unless otherwise specified.

A. Exterior Body

Figure 1A:
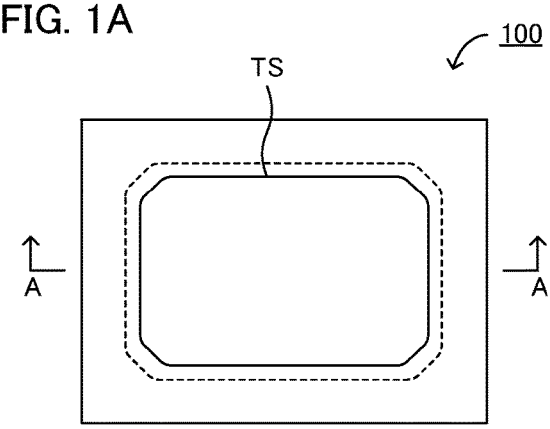
FIG. 1A is a schematic diagram illustrating an example of an exterior body in the present disclosure.
Figure 1B:
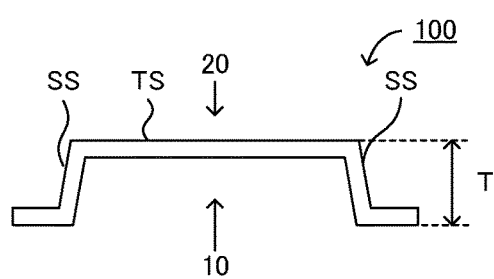
FIG. 1B is a cross-sectional view of FIG. 1A, taken along line A-A.
Figure 2:
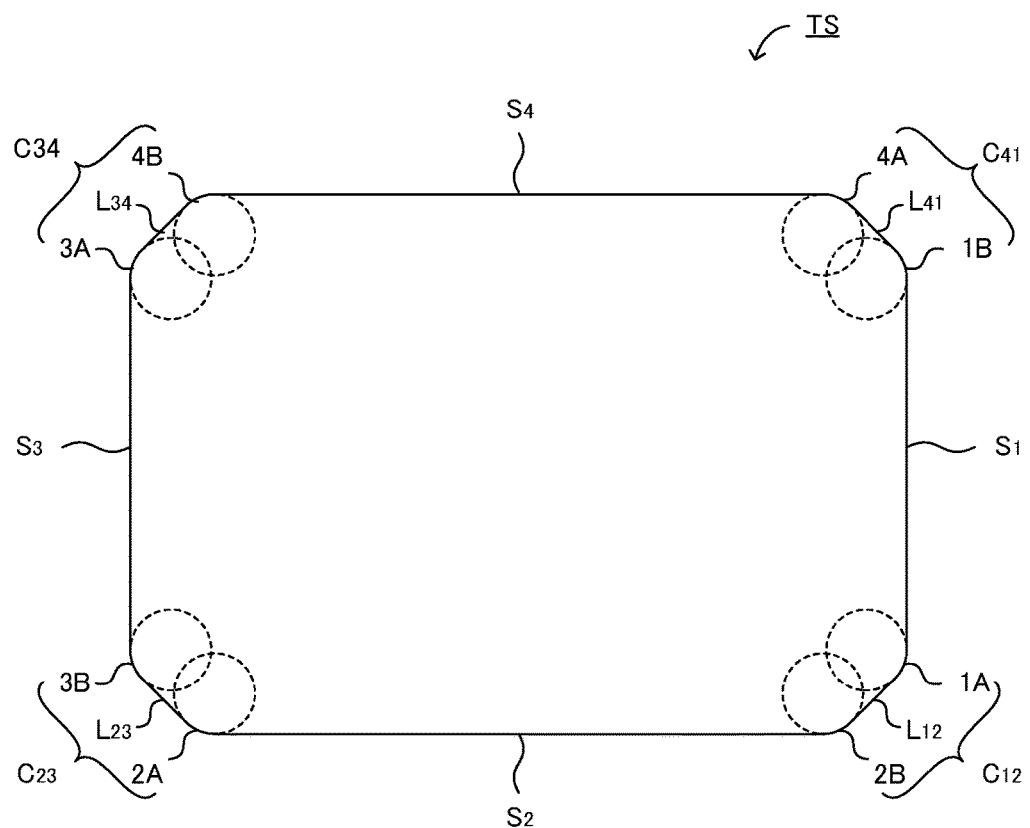
FIG. 2 is a schematic plan view illustrating an example of a top surface of a convex structure in the present disclosure.

FIG. 1A is a schematic plan view illustrating an example of an exterior body in the present disclosure, and FIG. 1B is a cross-sectional view of FIG. 1A, taken along line A-A. FIG. 2 is a schematic plan view illustrating a top surface of a convex structure in the present disclosure. As shown in FIGS. 1A and 1B, exterior body 100 includes convex structure 20 with space 10 for enclosing a power generation element (not shown in the figures). Also, convex structure 20 includes top surface TS. Also, as shown in FIG. 2, in plan view, top surface TS includes first side $S_1$, second side $S_2$ extending in a direction crossing first side $S_1$, first corner $C_{12}$ connecting first side $S_1$ and second side $S_2$. Also, in plan view, corner $C_{12}$ includes first primary curved portion 1A, first straight portion $L_{12}$, and first secondary curved portion 2B, from first side $S_1$ toward second side $S_2$.

According to the present disclosure, since corner $C_{12}$ includes straight portion $L_{12}$, the thickness at corner $C_{12}$ of the exterior body may be suppressed from being thinned. As described above, the convex structure including a space for enclosing a power generation element is formed, for example, by flanging (pressing) a laminate sheet. The corner of the convex structure is easily thinned by the stress at the time of pressing, and there may be a case where tearing occurs in the exterior body.

Figure 3A:
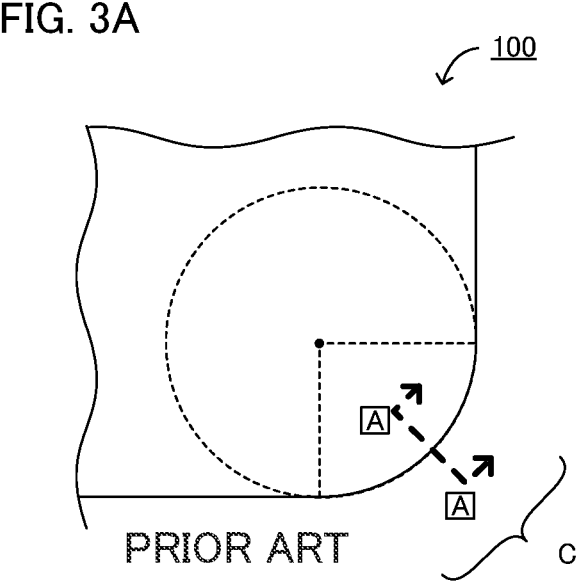
FIG. 3A is a schematic plan view illustrating an example of a conventional corner.
Figure 3B:
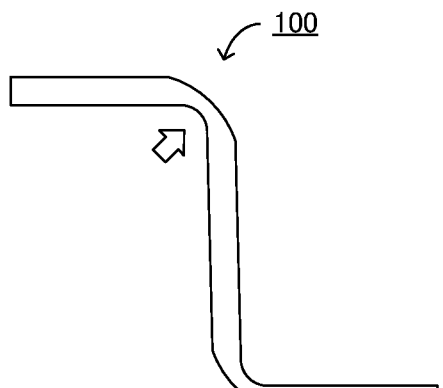
FIG. 3B is a cross-sectional view of FIG. 3A, taken along line A-A.

Here, FIG. 3A is a schematic plan view illustrating an example of a conventional corner, and FIG. 3B is an A-A cross-sectional view of FIG. 3A. As shown in FIG. 3A, in plan view, conventional corner C often includes only a curved portion (R-shaped portion). In that case, as shown in FIG. 3B, the thickness of exterior body 100 at corner C is likely to be thinned.

Figure 4A:
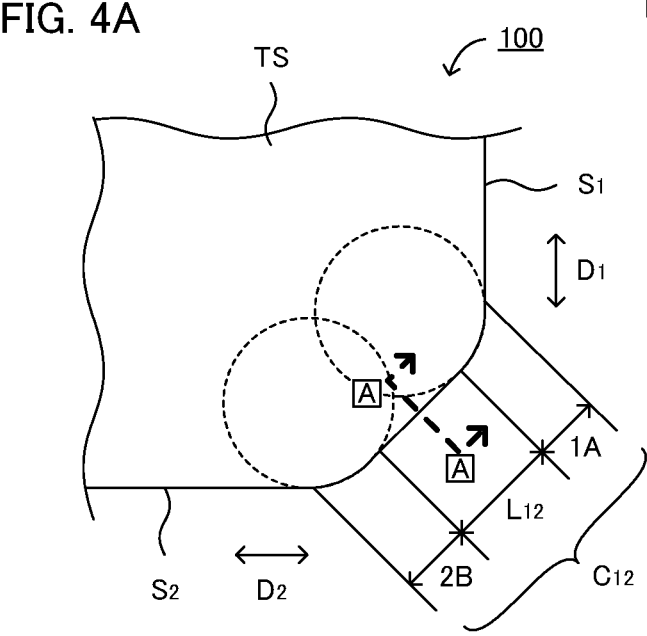
FIG. 4A is a schematic plan view illustrating an example of a corner in the present disclosure.
Figure 4B:
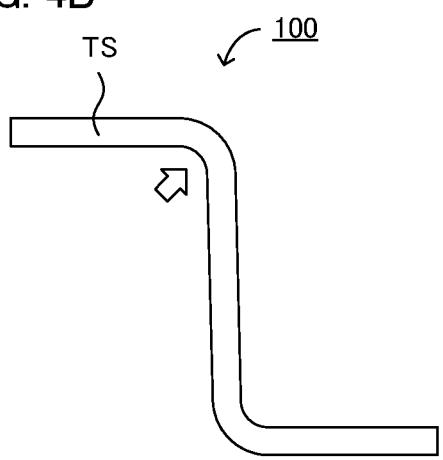
FIG. 4B is a cross-sectional view of FIG. 4A, taken along line A-A.

Meanwhile, FIG. 4A is a schematic plan view illustrating an example of a corner in the present disclosure, and FIG. 4B is a cross-sectional view of FIG. 4A, taken along line A-A. As shown in FIG. 4A, in plan view, the corner $C_{12}$ in the present disclosure includes curved portion 1A, straight portion $L_{12}$ and curved portion 2B from first side $S_1$, toward second side $S_2$. In conventional corner C, stress is concentrated only to the corner C. Meanwhile, in the present embodiment, since corner $C_{12}$ includes straight portion $L_{12}$, the concentration of the stress is dispersed to curved portion 1A, straight portion $L_{12}$, and curved portion 2B, whereby the concentration of the stress only to the corner at the time of pressing may be suppressed.

In the present disclosure, curved portion 1A and curved portion 2B are arranged at both ends of straight portion $L_{12}$. If, curved portion 1A and curved portion 2B are not provided, and if corner $C_{12}$ is composed of only straight portion $L_{12}$, the stress is concentrated to the contact between straight portion $L_{12}$ and the first side and, the contact between straight portion $L_{12}$ and the second side, respectively. In contrast to this, by providing curved portion 1A and curved portion 2B at both ends of straight portion $L_{12}$, it is possible to suppress the concentration of the stress at both ends of straight portion $L_{12}$. Consequently, it is possible to suppress the thickness at the corner $C_{12}$ from being thinned in an exterior body. In particular, when increasing the voltage or capacitance of a battery, it is necessary to increase the thickness of a power generation element. In the present disclosure, even in such a case, it is possible to suppress the thickness at corner $C_{12}$ from being thinned.

As shown in FIG. 1B, exterior body 100 comprises convex construction 20 including space 10 for enclosing a power generation element (not shown in the figure). Convex structure 20 includes top surface TS and side surface SS, and space 10 is a space formed by top surface TS and side surfaces SS.

Further, as shown in FIG. 4A, in plan view, top surface TS includes first side $S_1$, and second side $S_2$ extending in a direction crossing first side $S_1$. In some embodiments, the first side $S_1$ and second side $S_2$ are both linear. The angle (angle degree of acute angle side) formed by direction $D_1$ wherein first side $S_1$ extends, and direction $D_2$ wherein second side $S_2$ extends is, for example, 60° or more and 90° or less. Top surface TS includes corner $C_{12}$ connecting first side $S_1$ and second side $S_2$ in plan view. Furthermore, in plan view, corner $C_{12}$ includes curved portion 1A, straight portion $L_{12}$ and curved portion 2B from first side $S_1$ toward second side $S_2$.

Figure 5:
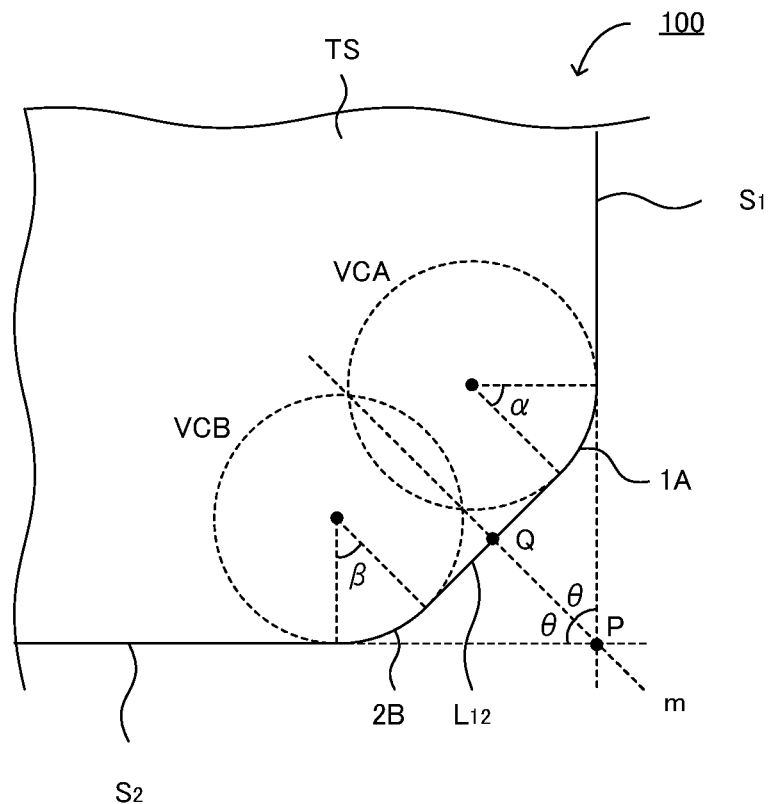
FIG. 5 is a schematic plan view illustrating an example of a corner in the present disclosure.

In some embodiments, as shown in FIG. 5, the curved portion 1A is connected to first side $S_1$. Further, curved portion 1A may be approximated as an arc of virtual circle VCA. The radius of virtual circle VCA (the curvature radius of curved portion 1A) is, for example, 0.5 mm or more, and may be 2 mm or more. Further, as shown in FIG. 5, when the center angle of the arc (arc of virtual circle VCA) corresponding to curved portion 1A is α, center angle α is, for example, 20° or more, and may be 30° or more. Meanwhile, center angle α is, for example, 70° or less, may be 60° or less, and may be 45° or less.

In some embodiments, as shown in FIG. 5, the straight portion $L_{12}$ connects curved portion 1A and curved portion 2B. The length of straight portion $L_{12}$ is, for example, 1 mm or more, may be 2 mm or more, and may be 3 mm or more. Also, as shown in FIG. 5, the intersection of the extension line of first side $S_1$ and the extension line of second side $S_2$ is regarded as P, and the angle formed by the extension line of first side $S_1$ and the extension line of second side $S_2$ is regarded as 2θ. Further, a straight line from intersection P which crosses each of first side $S_1$ and second side $S_2$ with an angle θ is regarded as m, and the intersection of straight line m and exterior body 100 is regarded as Q. In some embodiments of the present disclosure, the intersection Q is a point on straight portion 1,12. Since stress is particularly likely to be concentrated on intersection Q, it is possible to suppress the thickness at the corner $C_{12}$ of an exterior body from being thinned, by intersection Q being a point on straight portion $L_{12}$.

In some embodiments, as shown in FIG. 5, the curved portion 2B is connected to second side $S_2$. Further, curved portion 2B may be approximated as an arc of virtual circle VCB. Since the range of the radius of virtual circle VCB (the curvature radius of curved portion 2B) is the same as the range of the radius of virtual circle VCA (the curvature radius of curved portion 1A) described above, the description thereof is omitted here. The radius of virtual circle VCB and the radius of virtual circle VCA may be the same or different from each other. Further, as shown in FIG. 5, when the center angle of the arc corresponding to curved portion 2B is β (the arc of virtual circle VCB), the range of center angle β is the same as the range of center angle α, and therefore description thereof is omitted here. Center angle β and center angle α may be the same or different from each other.

In some embodiments, as shown in FIG. 2, the top surface TS includes third side $S_3$ facing first side $S_1$ in plan view. In some embodiments, the top surface TS includes fourth side $S_4$ facing second side $S_2$ in plan view. In some embodiments, the third side $S_3$ and the fourth side $S_4$ are both linear. In some embodiments, the angle formed by the direction in which first side $S_1$ extends and the direction in which third side $S_3$ extends (angle degree of acute angle side) is, for example, 30° or less. In some embodiments, the angle formed by the direction in which second side $S_2$ extends and the direction in which fourth side $S_4$ extends (angle degree of acute angle side) is, for example, 30° or less.

Top surface TS may include second corner $C_{23}$ connecting the second side and the third side. The shapes of corner $C_{23}$ is not particularly limited, and as shown in FIG. 2, and in some embodiments, includes second primary curved portion 2A, second straight portion $L_{23}$, and second secondary curved portion 3B from second side $S_2$ toward third side $S_3$. Curved portion 2A, straight portion $L_{23}$, and curved portion 3B are the same as those described for curved portion 1A, straight portion $L_{12}$, and curved portion 2B above, respectively, and therefore, description thereof is omitted here.

Top surface TS may include third corner $C_{34}$ connecting the third side and the fourth side. The shapes of corner $C_{34}$ is not particularly limited, and as shown in FIG. 2, in some embodiments, includes third primary curved portion 3A, third straight portion $L_{34}$, and third secondary curved portion 4B from third side $S_3$ toward fourth side $S_4$. Curved portion 3A, straight portion $L_{34}$, and curved portion 4B are the same as those described for curved portion 1A, straight portion $L_{12}$, and curved portion 2B above, respectively, and therefore, description thereof is omitted here.

Top surface TS may include fourth corner $C_{41}$ connecting the fourth side and the first side. The shapes of corner $C_{41}$ is not particularly limited, and as shown in FIG. 2, in some embodiments, includes fourth primary curved portion 4A, fourth straight portion $L_{41}$, and fourth secondary curved portion 1B from fourth side $S_4$ toward first side $S_1$. Curved portion 4A, straight portion $L_{41}$, and curved portion 1B are the same as those described for curved portion 1A, straight portion $L_{12}$, and curved portion 2B above, respectively, and therefore, description thereof is omitted here.

Also, as shown in FIG. 1B, the height of the convex structure is regarded as T. Height T of the convex structure is not particularly limited, and in some embodiments is 3 mm or more. As height T increases, the corners are likely to be thinned due to the stress during pressing. In contrast to this, in the present disclosure, since corner $C_{12}$ includes the straight portion, even when height T is large, it is possible to effectively suppress the thickness at corner $C_{12}$ from being thinned. Meanwhile, height T of the convex structure is, for example, 14 mm or less.

Figure 6:
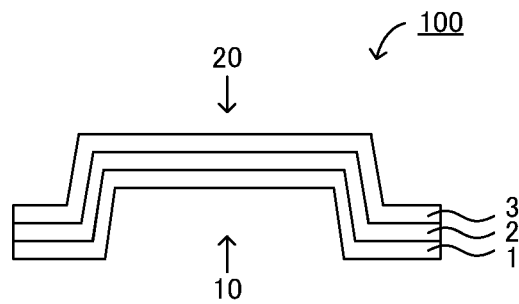
FIG. 6 is a schematic cross-sectional view illustrating an example of an exterior body in the present disclosure.

The layer structure of the exterior body in the present disclosure is not particularly limited. In some embodiments, as shown in FIG. 6, exterior body 100 includes thermal fusion layer 1, metal layer 2, and resin layer 3. Examples of the material for thermal fusion layer 1 may include olefin based resins such as polypropylene (PP) and polyethylene (PE). Examples of the material for metal layer 2 may include aluminum, an aluminum alloy, and stainless steel. Examples of the material for resin layer 3 may include polyethylene terephthalate (PET) and nylon. The thickness of each of thermal fusion layer 1, metal layer 2, and resin layer 3 is, for example, 30 μm or more and 60 μm or less.

The exterior body in the present disclosure is usually used for a laminated battery. The laminated battery will be described in detail later.

B. Laminated Battery

Figure 7A:
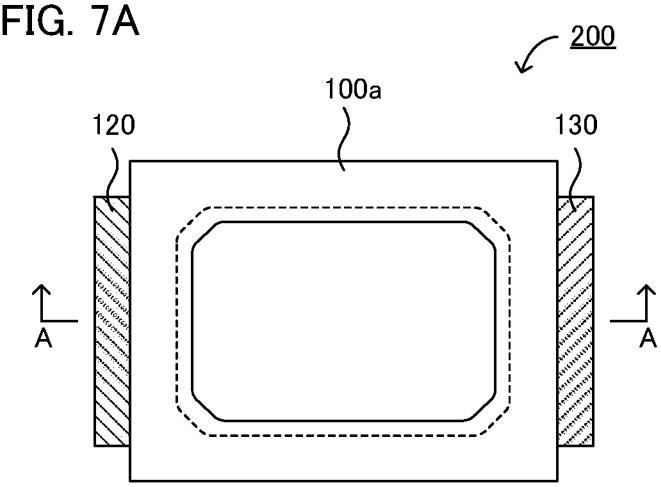
FIG. 7A is a schematic diagram illustrating an example of a laminated battery in the present disclosure.
Figure 7B:
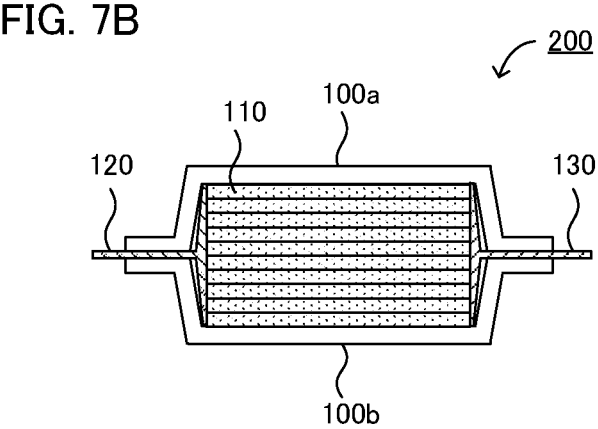
FIG. 7B is a cross-sectional view of FIG. 7A taken along line A-A.

FIG. 7A is a schematic plan view illustrating an example of a laminated battery in the present disclosure, and FIG. 7B is a cross-sectional view of FIG. 7A taken along line A-A. As shown in FIGS. 7A and 7B, laminated battery 200 comprises first exterior body 100a, second exterior body 100b, power generation element 110 enclosed between first exterior body 100a and second exterior body 100b, and cathode tag 120 and anode tag 130 connected to power generation element 110. Further, at least one of first exterior body 100a and second exterior body 100b is the exterior body described in "A. Exterior body" above.

According to the present disclosure, by using the above described exterior body, a laminated battery with high structural reliability may be obtained.

1. Exterior Body

The exterior body in the present disclosure is a member for enclosing a power generation element. In the present disclosure, at least one of the first exterior body and the second exterior body is the exterior body described in "A. Exterior body" above. Examples of an exterior body other than the above described exterior body may include a sheet-like exterior body having no convex structure.

2. Power Generation Element

The power generation element is a member enclosed between the first exterior body and the second exterior body. Although there is no particular limitation on the configuration of the power generation element, in some embodiments the power generation element includes at least a unit cell including a cathode active material layer, an anode active material layer, and an electrolyte layer.

The cathode active material layer contains at least a cathode active material, and may further contain at least one of a conductive material, a binder, and an electrolyte, if necessary. Further, the anode active material layer contains at least an anode active material, and may further contain at least one of a conductive material, a binder, and an electrolyte, if necessary.

The electrolyte layer is formed between the cathode active material layer and the anode active material layer and includes at least an electrolyte. The electrolyte may be a liquid electrolyte (electrolytic solution), may be a polymer electrolyte, and may be an inorganic solid electrolyte. The unit cell may include a cathode current collector for collecting current of the cathode active material layer and an anode current collector for collecting current of the anode active material layer. The type of the unit cell is not particularly limited, and in some embodiments is a lithium ion battery. Because it is a high-voltage and high-energy-density battery.

In some embodiments, the power generation element includes a plurality of unit cells along its thickness direction. The plurality of unit cells may be connected in series, and may be connected in parallel.

3. Laminated Battery

The laminated battery in the present disclosure usually includes a cathode tab connected to the cathode current collector and an anode tab connected to the anode current collector. Known current collecting tabs may be used for the cathode tab and the anode tab. The laminated battery in the present disclosure may be a primary battery, and may be a secondary battery which may be charged and discharged repeatedly, as an in-vehicle battery. The method of producing a laminated battery is not particularly limited. Examples thereof may include a method wherein a power generation element provided with a current collecting tab is housed between a first exterior body and a second exterior body, and heat-sealing the circumference of the housed power generation element, thereby thermally fusing the first exterior body and the second exterior body.

C. Method for Producing Exterior Body

The method for producing an exterior body in the present disclosure is a method for producing the above described exterior body, the method comprising a flanging step of forming the convex structure by flanging a laminate film, and a mold used for the flanging has a shape corresponding to the corner $C_{12}$.

According to the present disclosure, since the mold used for the flanging has a shape corresponding to the corner $C_{12}$, an exterior body wherein the thickness at corner of the convex structure is suppressed from being thinned, may be obtained.

The flanging step in the present disclosure is a step of forming the convex structure by flanging a laminate film. In the flanging, a convex structure is usually formed by placing a laminate sheet between a male mold and a female mold, and pressing. The shape corresponding to the corner $C_{12}$ is formed in the corners of the male and female molds. There is no particular limitation on the pressing conditions, and ordinary conditions may be adopted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST

1 . . . thermal fusion layer
2 . . . metal layer
3 . . . resin layer
10 . . . space
20 . . . convex structure
100 . . . exterior body
110 . . . power generation element
120 . . . cathode tab
130 . . . anode tab
200 . . . laminated battery

What is claimed is:

1. An exterior body for a laminated battery,
wherein the exterior body comprises a convex structure with a space for enclosing a power generation element, the exterior body including a thermal fusion layer, a metal layer, and a resin layer arranged in a stack,
the convex structure includes a top surface, a height of the convex structure being equal to or greater than 3 mm and less than or equal to 14 mm,
in plan view, the top surface includes a first side, a second side extending in a direction crossing the first side, a third side facing the first side, a fourth side facing the second side, a first corner connecting the first side and the second side, a second corner connecting the second side and the third side, a third corner connecting the third side and the fourth side, and a fourth corner connecting the fourth side and the first side, and
in plan view, the first corner includes a first primary curved portion, a first straight portion, and a first secondary curved portion, from the first side toward the second side,
in plan view, the second corner includes a second primary curved portion, a second straight portion, and a second secondary curved portion, from the second side toward the third side,
in plan view, the third corner includes a third primary curved portion, a third straight portion, and a third secondary curved portion, from the third side toward the fourth side,
in plan view, the fourth corner includes a fourth primary curved portion, a fourth straight portion, and a fourth secondary curved portion, from the fourth side toward the first side, and
when a center angle of arc of a virtual circle corresponding to the first primary curved portion is regarded as a center angle $\alpha$, the center angle $\alpha$ is equal to or greater than 20 degrees and less than or equal to 70 degrees.

2. A laminated battery comprising a first exterior body, a second exterior body, and a power generation element enclosed between the first exterior body and the second exterior body, and
at least one of the first exterior body and the second exterior body is the exterior body according to claim 1.

3. The exterior body according to claim 1, wherein the thermal fusion layer comprises at least one of polypropylene and polyethylene.

4. The exterior body according to claim 1, wherein the metal layer comprises at least one of aluminum, an aluminum alloy, and stainless steel.

5. The exterior body according to claim 1, wherein the resin layer comprises at least one of polyethylene terephthalate and nylon.

6. The exterior body according to claim 1, wherein when an intersection of an extension line of the first side and an extension line of the second side is regarded as a first intersection, an angle formed by the extension line of first side and the extension line of second side is regarded as an extension angle, a straight line from the first intersection with an angle is regarded as a straight line, and a second intersection of the straight line and the exterior body is regarded as a third intersection, the third intersection is a point on the first straight portion.

* * * * *